（12）United States Patent
Vandikas et al.

(10) Patent No.: US 10,887,820 B2
(45) Date of Patent: Jan. 5, 2021

(54) METHODS AND APPARATUS FOR ROUTING OF DATA PACKETS OVER A NETWORK (71) Applicant: Telefonaktiebolaget LM Ericsson (publ), Stockholm (SE)

(72) Inventors: Konstantinos Vandikas, Solna (SE); Athanasios Karapantelakis, Stockholm (SE); Leonid Mokrushin, Uppsala (SE); Maxim Teslenko, Sollentuna (SE); Keven Wang, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/335,041

(22) PCT Filed: Sep. 21, 2016

(86) PCT No.: PCT/EP2016/072392
§ 371 (c)(1),
(2) Date: Mar. 20, 2019

(87) PCT Pub. No.: WO2018/054457
PCT Pub. Date: Mar. 29, 2018

(65) Prior Publication Data
US 2020/0187086 A1   Jun. 11, 2020

(51) Int. Cl.
*H04W 40/20* (2009.01)
*H04W 4/02* (2018.01)
(Continued)

(52) U.S. Cl.
CPC .......... *H04W 40/20* (2013.01); *H04L 45/748* (2013.01); *H04W 4/023* (2013.01); *H04W 40/24* (2013.01);
(Continued)

(58) Field of Classification Search
CPC ..... H04W 40/20; H04W 4/023; H04W 40/24; H04W 40/38; H04W 64/006; H04W 72/1242; H04W 80/04; H04L 45/748
See application file for complete search history.

(56) References Cited

U.S. PATENT DOCUMENTS 5,412,648 A * 5/1995 Fan .................. H04L 12/56
2002/0091834 A1* 7/2002 Isozu .................. G06F 15/16
(Continued)

FOREIGN PATENT DOCUMENTS

WO 2015/124746 A1 8/2015

OTHER PUBLICATIONS

International Search Report and Written Opinion issued in International Application No. PCT/EP2016/072392, dated Dec. 22, 2016, 13 pages.

*Primary Examiner* — Ronald B Abelson
(74) *Attorney, Agent, or Firm* — Rothwell, Figg, Ernst & Manbeck, P.C.

(57) ABSTRACT

Methods and apparatus for routing data packets in a communications network, such as a packet-switched network (e.g. an IP network). Instead of, or in addition to, conventional routing techniques such as longest prefix matching, the disclosure provides a method by which a network node can determine whether to defer transmission of a particular data packet based on geographical location and velocity data. Particularly for data that can tolerate high latency, this will serve to reduce consumption of network resources without adversely impacting user experience.

20 Claims, 3 Drawing Sheets (51) Int. Cl.
   *H04W 40/24* (2009.01)
   *H04W 40/38* (2009.01)
   *H04W 64/00* (2009.01)
   *H04W 72/12* (2009.01)
   *H04W 80/04* (2009.01)
   *H04L 12/745* (2013.01)

(52) U.S. Cl.
   CPC ......... *H04W 40/38* (2013.01); *H04W 64/006* (2013.01); *H04W 72/1242* (2013.01); *H04W 80/04* (2013.01)

(56) References Cited

U.S. PATENT DOCUMENTS

| | | |
|---|---|---|
| 2006/0007863 A1 | 1/2006 | Naghian |
| 2008/0170536 A1* | 7/2008 | Marshack ............ H04B 7/185 |
| 2015/0163720 A1 | 6/2015 | Cordeiro De Oliveria Barros et al. |
| 2016/0037379 A1* | 2/2016 | Shafiee ............ H04W 28/0268 |
| 2016/0119812 A1* | 4/2016 | Owan ............... H04W 28/0236 |

\* cited by examiner

METHODS AND APPARATUS FOR ROUTING OF DATA PACKETS OVER A NETWORK

CROSS REFERENCE TO RELATED APPLICATION(S)

This application is a 35 U.S.C. § 371 National Stage of International Patent Application No. PCT/EP2016/072392, filed Sep. 21, 2016, designating the United States.

TECHNICAL FIELD

Examples of the present disclosure relate to methods and apparatus for the routing of data packets or datagrams over a network.

BACKGROUND

Data is transmitted over packet-switched networks in individual packets (or "datagrams"). Each data packet comprises a payload (i.e. the data that is to be conveyed) and a logical destination network address to which the data packet is to be routed.

For example, each device within an internet protocol (IP) network is given an IP address, which is an n-bit number (where n is 32 or 128 dependent on the particular protocol version implemented). Addresses can be assigned statically or dynamically.

Given the complexity of modern networks, there will generally be multiple possible routes by which a data packet may be transmitted from a sending device to a destination address. A device that generates the data packet, or an intermediate device that receives and must forward the packet towards its destination, must therefore decide how best to forward the data packet in order to meet a given metric. For example, it may generally be preferable for packets to be forwarded directly to the destination with the minimum numbers of hops, so as to reduce the amount of time in transit and the burden placed on the network.

Some routing methods involve the use of routing tables. A routing table is a data table stored in or otherwise accessible to a networked device, that contains a list of routes from that networked device to particular network destinations. The routing table may also contain one or more default routes in the event that a specified network address does not match any of the routes in the list.

The usual technique that is involved for selecting an IP entry in the routing table is that of longest prefix. Using this technique, the destination network address specified by a particular data packet is compared with the list of network destinations in the routing table. The route associated with the network destination in the list having the longest matching prefix is then chosen, based on the assumption that this network address is the closest possible to the destination that can be achieved in the given routing table.

For example, consider that a particular packet specifies a destination address of 192.168.10.20, and that the routing table contains routes for the following entries (in this case IPv4):

(1) 192.168.10.5/28
(2) 192.168.0.0/16

As the longest prefix match is with entry (1), the data packet is transmitted there via the route specified in the routing table.

SUMMARY

One problem that is associated with the conventional method of packet routing is that it does not take into account the possibility that networked devices may be moving. Networks are becoming increasingly mobile, and the transmitting node, the destination node, or both may be moving geographically. In some circumstances, it may be beneficial to take advantage of this fact and delay transmission of the data packet until the transmitting and destination nodes are geographically closer (e.g. so as to reduce usage of network resources).

In one aspect of the present disclosure, there is provided a method in a first node of a communications network, the communications network comprising a plurality of nodes, the first node having access to a memory on which is stored a routing table, the routing table comprising respective network addresses and indications of the geographical location for a subset of the plurality of nodes. The method comprises: obtaining a packet to be transmitted, the packet comprising an identification of the network address of a destination node; determining, from the routing table, a geographical location of a second node to which the packet is to be transmitted; and determining whether to defer transmission of the packet to the second node based on a geographical location of the first node, the geographical location of the second node, and at least one of a velocity of the first node and a velocity of the second node.

In another aspect of the disclosure, there is provided a first node of a communications network, the communications network comprising a plurality of nodes, the first node comprising having access to a memory on which is stored a routing table, the routing table comprising respective network addresses and indications of the geographical location for a subset of the plurality of nodes. The first node comprises: processor circuitry; and a computer-readable medium coupled to the processor circuitry and storing code which, when executed by the processor circuitry, causes the node to: obtain a packet to be transmitted, the packet comprising an identification of the network address of a destination node; determine, from the routing table, a geographical location of a second node to which the packet is to be transmitted; and determine whether to defer transmission of the packet to the second node based on a geographical location of the first node, the geographical location of the second node, and at least one of a velocity of the first node and a velocity of the second node.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Although the terms "wireless device" or "terminal device" may be used in the description, it is noted that these terms encompass other terms used to denote wireless devices, such as user equipment (UE). It should be understood by the person skilled in the art that "UE" is a non-limiting term comprising any mobile or wireless device or node equipped with a radio interface allowing for at least one of: transmitting signals in uplink (UL), receiving and/or measuring signals in downlink (DL), and transmitting and/or receiving signals in a D2D/sidelink mode. A wireless device herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "wireless device" or "UE", the terms "mobile device" and "terminal device" may be used interchangeably in the description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, Universal Mobile Telecommunications System (UMTS), Long-Term Evolution, LTE, etc.

It should be noted that use of the term "radio access node" as used herein can refer to a base station, such as an eNodeB, a network node in the RAN responsible for resource management, such as a radio network controller (RNC), or, in some cases, a core network node, such as a mobility management entity (MME), a ProSe function (ProSe-F) node or a ProSe Application Server. It may also refer to an access point (AP) implementing IEEE 802.11 standards. The term "network node" encompasses radio access nodes, and also nodes within or accessible via a core network. For example, a network node may comprise a server that is located remote from a radio access node, but receives data signals from the radio access node and provides control signals for the radio access node. This latter example reflects the increasing trend in telecommunications systems for functionality to be removed to servers operating in "the cloud".

Figure 1:
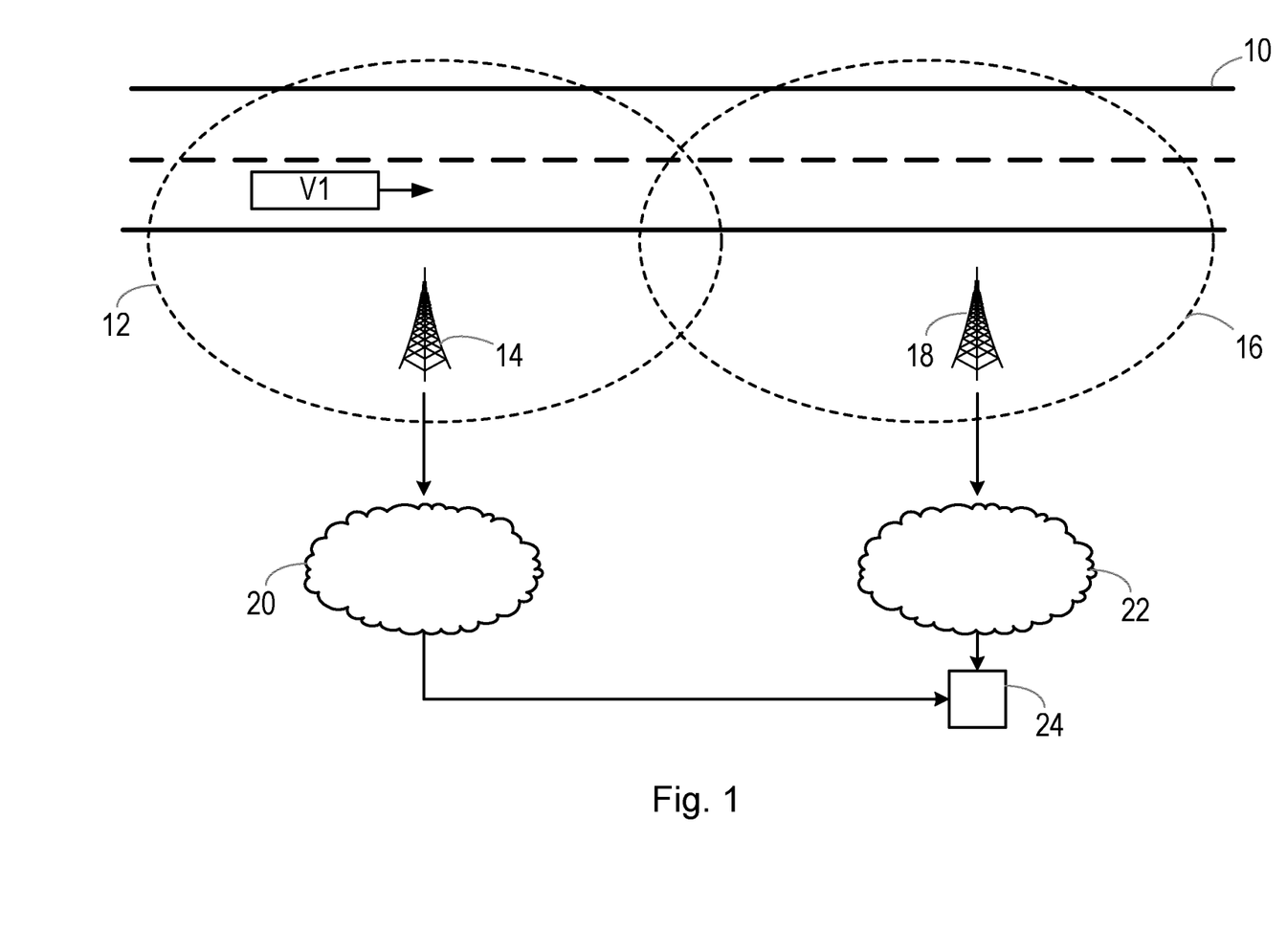
FIG. 1 is a schematic drawing of a wireless network according to embodiments of the disclosure.

FIG. 1 shows a schematic drawing of a wireless network according to embodiments of the disclosure.

A vehicle V1 is moving on a road 10, along the direction indicated by the arrow. The vehicle may have a wireless device or terminal device integrated within it (as is becoming increasingly common for motor vehicles), or an occupant within the vehicle may possess a wireless device or terminal device.

FIG. 1 also shows a wireless cellular communications network (or a portion of a wireless cellular communications network), through which the road 10 runs. The cellular network may at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/ Enhanced Data rate for GSM Evolution (GSM/EDGE), Wideband Code Division Multiple Access (WCDMA), Worldwide Interoperability for Microwave Access (WiMax), Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT, High Rate Packet Data (HRPD) and IEEE 802.11 just to mention some options. The network may be suitable for providing radio communications meeting one or more of the criteria established by the Next Generation Mobile Networks Alliance for the 5th generation of mobile telecommunications standards.

The network comprises a first cell 12, which is served by a first radio access node 14, and a second cell 16 which is served by a second radio access node 18. The radio access nodes 14, 18 may be referred to as e.g. base stations, NodeBs, evolved NodeBs (eNB, or eNodeB), base transceiver stations, access points (i.e. implementing IEEE 802.11x wireless technology), base station routers, radio base stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

The first radio access node 14 is coupled to a first packet-switched network 20, while the second radio access node 18 is coupled to a second packet-switched network 22. Both first and second networks 20, 22 are coupled to a content server 24. However, the second network 22 is geographically closer to the content server 24 than the first network 20.

It should be noted that, in the illustration, the cells 12, 16 are shown as neighbouring, even overlapping in their respective coverage areas. However, in general the cells may be far apart and non-neighbouring.

In this scenario, the wireless device in the vehicle V1 would like to access some content that is stored on the server 24. For example, a user of the wireless device may want to download a song, or video, for playback to the occupants of the vehicle. In order to initiate this access, the wireless device generates a data packet, with a destination network address matching the network address of the content server 24. The wireless device must then decide how best to route that packet over the various networks that are available to it, towards the content server 24. Of course, it should be noted that a networked device may need to transmit a data packet to a destination device for any of a large number of different reasons. The present disclosure is not limited in this sense.

In order to solve this problem, the wireless device comprises, or has access to, memory on which is stored a routing table. Conventionally, as described above, the routing table contains a list of routes from the wireless device to particular network destinations. For example, the particular network destinations may comprise network destinations that the wireless device has previously transmitted packets to, or network destinations that are written to the routing table by an operator of the network. It is also common for addresses to specify a block of network addresses, e.g. as specified in a classless inter-domain routing (CIDR) range. A single entry within the routing table may therefore relate to multiple network addresses. The routing table may also contain one or more default routes in the event that a specified network address does not match any of the routes in the list.

According to embodiments of the disclosure, however, one or more entries within the routing table are augmented with the geographical location (or "geolocation") of the device associated with the network address. Thus, in addition to the network address (e.g. IP address) and the routing instructions to reach that network address, one or more entries within the routing table comprise an indication of the geographical location of the address.

The indication of the geographical location may be expressed in terms of latitude and longitude coordinates, for example. For entries relating to a block of network addresses, the indication of the geographical location may be an indication of the geographical area within which the network addresses are located. For example, the geographical area may be a bounding box (e.g. a polygon) containing the geographical locations of all nodes with addresses within the specified block. The formal description of this box in the routing table may take the form of a list of geographical coordinates designating the vertices of the box, for example.

In some embodiments of the disclosure, one or more entries within the routing table may be further augmented with the velocity of the node associated with the network address. In this context, the term "velocity" takes its usual meaning as a vector, containing indications of both the speed and direction of travel. Thus, in these embodiments, an entry within the routing table may contain a network address, routing instructions for packets to be sent to that network address, an indication of the geographical location of the node associated with the network address, and an indication of the velocity with which that node is travelling (if any).

In one embodiment the geographical location and velocity information are embodied as a series of geographical locations (e.g. latitude-longitude tuples) with corresponding timestamps indicating the times that the network node in question was at those locations. In this embodiment, the velocity information is implicit rather than explicit.

The geographical location and velocity data can be generated by sending requests to the different network addresses in the routing table to collect information about their location and their velocity. These devices may in turn use the same technique to collect information from the devices in their routing tables and so on. Such messages can be broadcast periodically in order to keep the information up to date. However, the propagation of these messages may be limited in order to avoid network congestion.

Returning to the network of FIG. 1, and the example addresses given in the background described above, let us assume that the content server (i.e. the final destination for the data packet) has a network address of 192.168.10.20, and that the routing table for the wireless device within the vehicle V1 contains separate entries for the first network 20 and the second network 22 as follows (in this case IPv4):

First network 20: 192.168.10.5/28
Second network 22: 192.168.0.0/16

As the content server itself is not listed within the routing table, using conventional methods (i.e. longest prefix-matching) the data packet is transmitted to the first network 20 and from there to the content server 24. However, by implementing a routing method according to embodiments of the disclosure, the wireless device may instead opt to defer transmission of the packet until the vehicle V1 is within range of the second network 22. For example, based on knowledge of the geographical locations of the vehicle V1, the first and second networks 20, 22 and the content server 24 (the latter of which may be acquired), as well as the velocity of the vehicle V1, the wireless device may determine that the second network 22 is closer to the content server 24 than the first network 20, and that the wireless device is moving towards the second network 22. In some circumstances, it may therefore be preferable to delay transmission of the data packet until the device is within range of the second network 22.

The methods by which a node determines whether or not to defer transmission of a packet will be described in greater detail below, particularly with respect to FIG. 2. A further concept that will be useful in that context is the priority parameter.

According to some embodiments of the disclosure, in addition to the payload and the destination network address, a data packet may comprise a priority parameter that indicates the urgency with which the data packet should be delivered. In some embodiments, the priority parameter comprises an amount of time within which the packet is to be delivered to the destination node, also referred to as a "time to delivery" (TTD) value. In other embodiments, the priority parameter may simply indicate whether or not the data packet is delay-sensitive (i.e. without indicating a particular time value).

The next phase of mobile telecommunications standards (commonly referred to as $5^{th}$ generation mobile networks, or simply 5G) is expected to promote the development of large numbers of use cases, with each use case placing potentially diverse requirements on the network. Some use cases (e.g. media on demand) may prioritize high download speeds over latency; others (e.g. autonomous vehicle control, remote surgery, etc) may prioritize low latency over other factors. It is expected therefore that not all data packets will be as sensitive to delay as each other. In fact this is also true for conventional networks not meeting the 5G standards. For example, the data for a non-critical application update is not typically required with minimal delay.

Some delay is inevitable, of course, as the transmission of data packets takes a finite amount of time. For some use cases, delay is generally unacceptable and should be minimized; for others, however, a significant delay may be acceptable without compromising the user experience.

Figure 2:
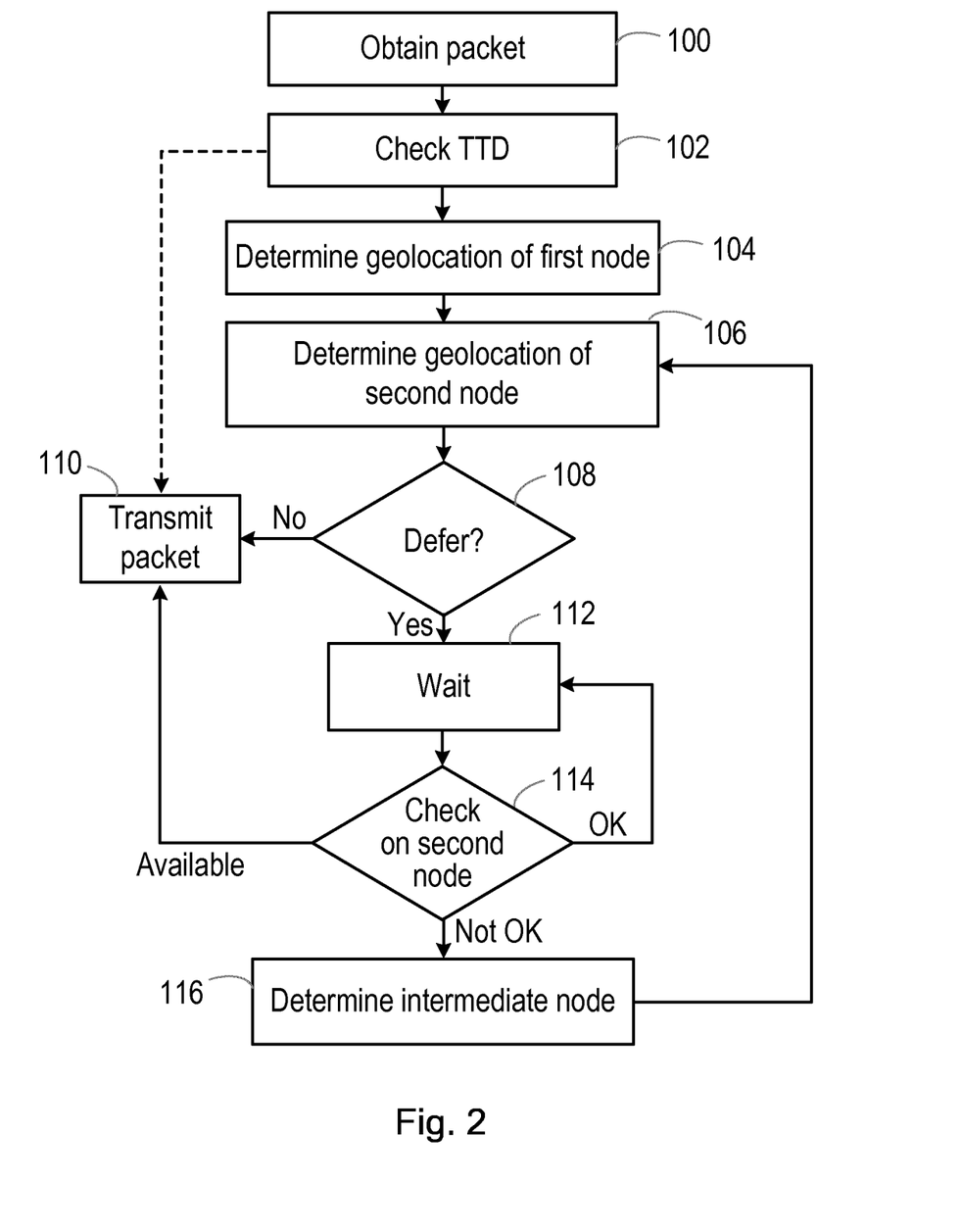
FIG. 2 is a flowchart of a method according to embodiments of the disclosure.

FIG. 2 is a flowchart of a method in accordance with embodiments of the disclosure. The method is carried out within a first network node, e.g. the wireless device within the vehicle V1. Note, however, that the first network node may not necessarily be the source of the data packet, but could also be an intermediate node between the source and destination nodes, seeking to forward the data packet towards its ultimate destination.

The method begins in step 100 in which a data packet to be transmitted is obtained. If the first network node is the source of the data packet, step 100 comprises generating the data packet within the first network node; if the first network node is not the source of the data packet (i.e. the first network node is an intermediate node in the route from source to destination), step 100 comprises receiving the data packet from another network node. Note that the network node from which the data packet is received may be the source of the data packet or another intermediate node in the route from source to destination.

As noted above, the data packet comprises at least a destination network address and a payload (i.e. the data which is to be transmitted to the destination network address).

The destination network address is a logical address (e.g. an IP address in IP networks).

The data packet may also comprise a priority parameter indicating the urgency with which the packet should be delivered to the destination network address. In some embodiments, the priority parameter comprises an amount of time within which the packet is to be delivered to the destination node, also referred to as a "time to delivery" (TTD) value. In other embodiments, the priority parameter may simply indicate whether or not the data packet is delay-sensitive (i.e. without indicating a particular time value).

The priority parameter may be set by the source of the data packet (which may be the first network node in some embodiments), for example dependent on the service to which the data packet relates. Some services may require a particularly low latency, and thus the priority parameter may be set to a value indicating that no delay is acceptable in the onward transmission of the data packet; in other words, that the data packet is to be transmitted with a high (or the highest) priority. For example, the priority parameter in this case may be set to a first value such as 0, or some other null value. Other services may tolerate some degree of latency (potentially high degrees of latency). In these cases, the priority parameter may be set to a second value different than the first value. For example, the second value may be a single value (i.e. indicating that some predefined delay is tolerated), or a value selected from a finite set of predefined discrete values; alternatively, the second value may be selected from within a predefined range (i.e. ranging from minimal tolerance of latency to a predefined maximum). In some embodiments, the priority parameter may comprise an indication of the time to deliver (TTD) the data packet to its destination, i.e. the amount of time within which the data packet should be delivered to its destination.

The data packet may also comprise the network address (i.e. the logical network address) of the source node of the data packet.

If they are available, step 100 may comprise the accumulation of multiple data packets having the same destination network address and the same priority parameter, i.e. such that multiple data packets can be processed in parallel according to the same parameters.

In step 102, the first network node checks the priority parameter, if present. In some embodiments, if the value of the priority parameter is the first value (e.g. zero, or null), the first network node may immediately transmit the data packet according to a default routing mechanism, such as the longest prefix matching algorithm. Thus, in these embodiments, the first network node consults its routing table to find the entry with the longest prefix that matches the destination network address, and transmits the data packet according to the routing specified in that entry.

In other embodiments, or where the priority parameter is not the first value, the method proceeds to step 104, in which the first network node determines its geographical location (geolocation). Many devices have a mechanism by which to determine their own geographical location, e.g. through GPS signalling, GLONASS, etc. These devices may simply employ that mechanism to determine their location in step 104. For devices that do not have a suitable locating mechanism, or do not wish to use it, third-party services are available that can identify the location of a device based on their network address. See, for example, the website at https://www.iplocation.net. It will be noted that, particularly for devices with no geolocating mechanism, or devices that are expected to be stationary during their operative lifetime, step 104 may take place out of the explicit order shown in FIG. 2.

Step 104 may additionally involve determining the velocity of the first network node, using the same mechanisms and third-party services as recited above. For example, by obtaining the geographical location multiple times over a period, the speed and direction of travel of the first network node may be ascertained. Alternatively, the first network node may know that it is stationary and omit this step. For example, if the first network node is a stationary part of the network infrastructure, such as a base station, then it need not determine its own velocity.

The method proceeds to step 106, in which the first network node determines the geolocation of a second network node which, as will be explained below, may be the destination node (i.e. the node associated with the destination network address) or an intermediate node between the first network node and the destination node.

According to embodiments of the disclosure, step 106 comprises accessing the routing table and particularly the entry associated with the second network node, and accessing the geolocation data associated with that entry. If available, step 106 may additionally involve obtaining the velocity of the second network node from the routing table.

Note that, if the second network node is not associated with any entry in the routing table (i.e. the first network node has no routing information and no geographical data for the second network node), the method may abort at this stage, with routing taking place via conventional methods (such as longest prefix matching).

The first network node now has knowledge of its own geographical location, the geographical location of the second network node, and either its own velocity or the velocity of the second network node, or both. If neither node is moving, again the method may abort, with routing taking place via conventional methods (such as longest prefix matching). Assuming that at least one of the nodes is moving, however, in step 108, the first network node uses this information to determine whether or not to defer transmission of the data packet.

Multiple different algorithms may be employed to make the determination. For example, the first network node may determine that the distance between the first network node and the second network node is decreasing, i.e. the two network nodes are getting closer to each other. In response to such a determination, the first network node may decide to defer transmission of the packet to the second node. This deferral may continue until the first network node and the second network node are within a threshold distance of each other (or the first network node calculates that the first network node and the second network node are likely to be within a threshold distance of each other). For example, the threshold distance may be set such that the nodes are close enough for a direct transmission to be possible between them.

If the first network node determines that the distance between the first and second network nodes is increasing (i.e. the two network nodes are moving away from each other), the first network node may elect not to defer transmission of the data packet in step 108, or to halt any deferral that is ongoing, and transmit the data packet immediately according to the routing instructions contained within the entry in the routing table in step 110.

In other embodiments, the first network node may involve the priority parameter in the algorithm (if available). For example, the first network node may determine whether or not the first node and the second node will be, or are likely to be, within a threshold distance of each other within the TTD value specified in the priority parameter. If the first network node will, or is likely to be, within the threshold distance of the second network node within the TTD value, the first network node may elect to defer transmission of the packet to the second network node. If not, the first network may elect not to defer transmission of the packet, and transmit the data packet immediately in step 110 according to the routing instructions contained within the entry in the routing table.

The calculations in step 108 may involve the use of linear interpolation techniques to determine the likely location of each device at any point in time. For example, taking as input one or more locations of the devices and the times that they were at those locations, linear interpolation techniques can be used to extrapolate the data and determine where those devices are, or are likely to be, in the future. If too complex for the processing circuitry in the first network node, such calculations on the likely trajectory of each device may be carried out in a more centralized fashion, such as a node in the cloud of a software defined network (SDN) controller.

The calculations may also determine the time at which the first network node and the second network node will be, or are likely to be, closest or within the threshold distance of each other. Assuming this value is finite, and within the TTD value if available, the first network node can decide to defer delivery. However, the first network node also knows how long it will have to wait before transmitting the data packet.

Thus, if the first network node opts to defer delivery of the data packet, the method proceeds to step 112 in which the first network node waits without transmitting the data packet to its destination.

During this period of deferral, in step 114 the first network node may perform one or more checks on the location and/or availability of the second network node. For example, the first network node may check whether the second network node is available for transmission from the first network node; whether the second network node is following its expected trajectory; whether the distance between the first and second network nodes is increasing or decreasing. If the second network node is available for transmission, the method may proceed directly to step 110 in which the first network node transmits the packet directly to the second network node, i.e. not along the routing defined in the routing table, but via a direct transmission such as a wireless transmission. If the second network node is following its expected course or trajectory, the method can return to step 112 to continue waiting.

If the second network node is not following its expected course or trajectory (particularly if the actual course indicates that the second network node will never—or not within the TTD value—come within the threshold distance of the first network node), the method proceeds to step 116 in which the first network node determines an alternative network node to which the packet may be delivered. For example, the alternative network node may be an intermediate node between the first network node and the destination node.

For example, the first network node may determine the network node in its routing table that is closest geographically to the second network node, and select that node as the alternative node. The method may then revert to step 106 in respect of this alternative node, determining the geographical location (and possibly the velocity) of the alternative node, determining whether to defer transmission to the alternative node, etc. Note that the original TTD value must be maintained (if available), and that the process will only continue if the TTD value is still valid. Also, the intermediate node must know to forward the packet on to its original destination, so the destination network address must also be maintained. However, otherwise the process is similar to that described above.

In one embodiment, the determination process in step 108 may also take into account planned destination information for the first network node, the second network node, or both. For example, either or both of the first and second network nodes may be moving according to a predefined (or dynamically planned) route. Such information may be embodied by a list of <destination, estimated time of arrival> tuples, designating waypoints in the node's route.

Figure 3:
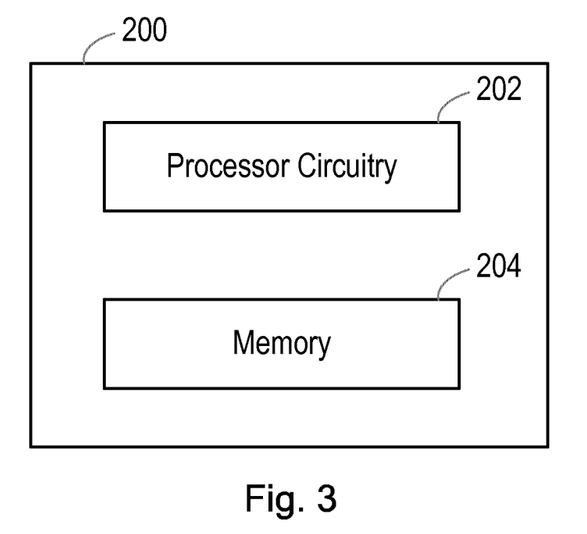
FIG. 3 is a schematic diagram of a network node according to embodiments of the disclosure.

FIG. 3 is a schematic diagram of a network node 200 in accordance with embodiments of the disclosure. The network node 200 may be suitable for carrying out the method described above with respect to FIG. 2, for example.

The network node 200 is suitable for operation within a communications network comprising a plurality of nodes, and has access to a memory on which is stored a routing table comprising respective network addresses and indications of geographical location for a subset of the plurality of nodes. Typically the routing table will not contain data for all nodes within the communications network. The network node itself comprises processor circuitry 202 and a computer readable medium 204 (such as memory). In some embodiments the computer-readable medium 204 stores the routing table. The computer-readable medium 204 is coupled to the processor circuitry 202 and stores code which, when executed by the processor circuitry 202, causes the network node 200 to: obtain a packet to be transmitted, the packet comprising an identification of the network address of a destination node; determine, from the routing table, a geographical location of a second node to which the packet is to be transmitted; and determine whether to defer transmission of the packet to the second node based on a geographical location of the first node, the geographical location of the second node, and at least one of a velocity of the first node and a velocity of the second node.

In some embodiments, the network node 200 may also comprise one or more interfaces (not illustrated) over which packets can be transmitted. For example, the network node 200 may comprise wired or wireless transceiver circuitry.

Figure 4:
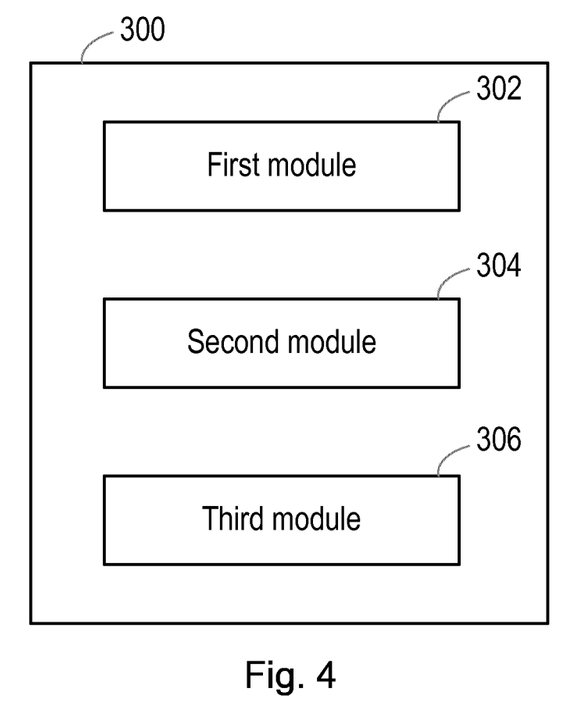
FIG. 4 is a schematic diagram of a network node according to further embodiments of the disclosure.

FIG. 4 is a schematic diagram of a network node 300 according to further embodiments of the disclosure. The network node 300 may be suitable for carrying out the method shown in FIG. 3, for example.

The network node 300 is suitable for operation within a communications network comprising a plurality of nodes, and has access to a memory on which is stored a routing table comprising respective network addresses and indications of geographical location for a subset of the plurality of nodes. The network node 300 itself comprises a first module 302 configured to obtain a packet to be transmitted, the packet comprising an identification of the network address of a destination node. The network node 300 comprises a second module 304 configured to determine, from the routing table, a geographical location of a second node to which the packet is to be transmitted. The network node 300 further comprises a third module 306 configured to determine whether to defer transmission of the packet to the second node based on a geographical location of the first node, the geographical location of the second node, and at least one of a velocity of the first node and a velocity of the second node.

The network node 300 may further comprise one or more interface modules (not illustrated) for communicating with other nodes of the network. For example, the node 300 may comprise a transceiver module for transmitting and receiving wireless signals. The node 300 may comprise a wired interface module, for transmitting and receiving signals over a wire.

The disclosure thus provides methods and apparatus for routing data packets in a communications network, such as a packet-switched network (e.g. an IP network). Instead of, or in addition to, conventional routing techniques such as longest prefix matching, the disclosure provides a method by which a network node can determine whether to defer transmission of a particular data packet based on geographical location and velocity data. Particularly for data that can tolerate high latency, this will serve to reduce consumption of network resources without adversely impacting user experience.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method performed by a first node of a communications network, the communications network comprising a plurality of nodes, the first node having access to a memory storing a routing table, the routing table comprising respective network addresses and indications of the geographical location for a subset of the plurality of nodes, the method comprising:
    obtaining a packet to be transmitted;
    obtaining, from the routing table, information indicating a geographical location of a second node;
    determining, based on a geographical location of the first node and the geographical location of the second node, that the distance between the first node and the second node exceeds a threshold distance;
    determining, based on the geographical location of the first node, the geographical location of the second node, and at least one of a velocity of the first node and a velocity of the second node, whether at a particular time in the future the distance between the first node and the second node will still exceed the threshold distance; and
    as a direct result of determining that at the particular time in the future the distance between the first node and the second node will still exceed the threshold distance, transmitting the packet to a third node.

2. The method of claim 1, wherein the packet further comprises a priority parameter indicating the urgency to deliver the packet.

3. The method of claim 2, wherein
    the packet comprises an identification of the network address of a destination node, and
    the priority parameter comprises an amount of time within which the packet is to be delivered to the destination node.

4. The method of claim 1, wherein the packet is immediately transmitted to the third node.

5. The method of claim 1, wherein the packet is transmitted to the third node in accordance with a routing instruction in the routing table.

6. The method of claim 5, wherein
    the obtained packet is addressed to the second node, and
    the third node is an intermediate node configured to forward the packet towards the second node.

7. The method of claim 1, wherein the routing table further comprises respective indications of the velocities of one or more of the nodes within the subset.

8. The method of claim 1, wherein the step of determining whether at the particular time in the future the distance between the first node and the second node will still exceed the threshold distance comprises calculating at least one of:
    an expected trajectory for the first node based on the geographical location of the first node and the velocity of the first node; or
    an expected trajectory for the second node based on the geographical location of the second node and the velocity of the second node.

9. The method of claim 1, wherein
    the packet comprises an identification of the network address of a destination node, and
    the second node is the destination node or an intermediate node between the first node and the destination node.

10. The method of claim 1, wherein the routing table comprises one or more of:
    one or more entries specifying respective network addresses and geographical locations for individual nodes within the subset; or
    one or more entries specifying ranges of network addresses and respective geographical areas for more than one node within the subset.

11. The method of claim 1, wherein the step of obtaining a packet to be transmitted comprises:
    generating the packet to be transmitted; or
    receiving the packet to be transmitted from another node of the communications network.

12. The method of claim 1, wherein the packet is an internet protocol (IP) packet, and the network address is an IP address.

13. A first node of a communications network, the communications network comprising a plurality of nodes, the first node comprising having access to a memory storing a routing table, the routing table comprising respective network addresses and indications of the geographical location for a subset of the plurality of nodes, the first node comprising:
    processor circuitry; and
    a computer-readable medium coupled to the processor circuitry and storing code which, when executed by the processor circuitry, causes the node to:
    obtain a packet to be transmitted;

obtain, from the routing table, information indicating a geographical location of a second node;

determine, based on a geographical location of the first node and the geographical location of the second node, that the distance between the first node and the second node exceeds a threshold distance;

determine, based on the geographical location of the first node, the geographical location of the second node, and at least one of a velocity of the first node and a velocity of the second node, whether at a particular time in the future the distance between the first node and the second node will still exceed the threshold distance; and as a direct result of determining that at the particular time in the future the distance between the first node and the second node will still exceed the threshold distance, transmit the packet to a third node.

14. The first node of claim 13, wherein the packet further comprises a priority parameter indicating the urgency to deliver the packet.

15. The first node of claim 14, wherein
the packet comprises an identification of the network address of a destination node, and
the priority parameter comprises an amount of time within which the packet is to be delivered to the destination node.

16. The first node of claim 13, wherein the first node is configured such that the first node immediately transmit the packet to the third node as a direct result of determining that at the particular time in the future the distance between the first node and the second node will still exceed the threshold distance.

17. The first node of claim 13, wherein the first node is configured such that the first node transmits the packet to the third node in accordance with a routing instruction in the routing table.

18. The first node of claim 17, wherein
the obtained packet is addressed to the second node, and
the third node is an intermediate node configured to forward the packet towards the second node.

19. The first node of claim 13, wherein
the packet comprises an identification of the network address of a destination node, and
the second node is the destination node or an intermediate node between the first node and the destination node.

20. A method performed by a first node of a communications network, the communications network comprising a plurality of nodes, the first node having access to a memory storing a routing table, the routing table comprising respective network addresses and indications of the geographical location for a subset of the plurality of nodes, the method comprising:

obtaining a packet to be transmitted;

obtaining, from the routing table, information indicating a geographical location of a second node;

determining, based on a geographical location of the first node and the geographical location of the second node, that the distance between the first node and the second node exceeds a threshold distance;

determining, based on the geographical location of the first node, the geographical location of the second node, and at least one of a velocity of the first node and a velocity of the second node, whether at a particular time in the future the distance between the first node and the second node will still exceed the threshold distance; and as a direct result of determining that at the particular time in the future the distance between the first node and the second node will still exceed the threshold distance, immediately transmitting the packet, wherein at the time the first node immediately transmitted the packet, the first node had not previously transmitted the packet to any other node.

* * * * *